United States Patent
Ganev et al.

(10) Patent No.: US 7,863,867 B2
(45) Date of Patent: Jan. 4, 2011

(54) OVERLOAD CONTROL OF AN ELECTRIC POWER GENERATION SYSTEM

(75) Inventors: Evgeni Ganev, Torrance, CA (US); Louis C. H. Cheng, Richmond Hill (CA)

(73) Assignee: Honeywell International Inc., Morristown, NJ (US)

( * ) Notice: Subject to any disclaimer, the term of this patent is extended or adjusted under 35 U.S.C. 154(b) by 569 days.

(21) Appl. No.: 11/861,070

(22) Filed: Sep. 25, 2007

(65) Prior Publication Data

US 2009/0079399 A1 Mar. 26, 2009

(51) Int. Cl.
*H02P 11/00* (2006.01)
*H02P 9/00* (2006.01)

(52) U.S. Cl. ......................................... 322/37; 322/44

(58) Field of Classification Search .................. 322/44, 322/59, 89, 28, 37, 25; 361/20
See application file for complete search history.

(56) References Cited

U.S. PATENT DOCUMENTS

| | | | |
|---|---|---|---|
| 6,798,627 B2 * | 9/2004 | Schultz et al. ................ 361/20 |
| 7,116,083 B2 | 10/2006 | Kalman et al. | |
| 2004/0088103 A1 * | 5/2004 | Itow et al. ..................... 701/110 |
| 2005/0135031 A1 * | 6/2005 | Colby et al. ................... 361/78 |
| 2006/0069903 A1 * | 3/2006 | Fischer et al. .................. 713/1 |
| 2007/0012492 A1 * | 1/2007 | Deng et al. ................ 180/65.1 |
| 2007/0046266 A1 * | 3/2007 | Ganev et al. .................. 322/28 |
| 2009/0290270 A1 * | 11/2009 | Ganev et al. .................. 361/21 |

\* cited by examiner

*Primary Examiner*—Julio Gonzalez
(74) *Attorney, Agent, or Firm*—Oral Caglar, Esq.

(57) ABSTRACT

A control system for an electrical power generation system (EPGS) provides overload protection without disconnecting a generator of the EPGS from an excessive electrical load. Available engine power and current levels of the electrical load are continuously measured. A command voltage is calculated that corresponds to a voltage required to sustain with the maximum available power. Output voltage of a generator of the EPGS is controlled at the calculated command voltage so that a power limit of the engine is not exceeded during electrical overload conditions.

13 Claims, 4 Drawing Sheets

OVERLOAD CONTROL OF AN ELECTRIC POWER GENERATION SYSTEM

BACKGROUND OF THE INVENTION

The present invention is in the field of electrical power generating and, more particularly, electrical power generating systems (EPGS) that may be subjected to electrical overloading.

In some applications of EPGS's, electrical loading may produce electrical power that exceed available power deliverable to a shaft of a generator of the EPGS. An aircraft power system may be one example of such an application of an EPGS. In an aircraft, a shaft driven generator may be powered with a turbine engine. Conditions may arise, during operation of the aircraft, when electrical power demands increase rapidly. In some cases, these demands, or increases in electrical load may exceed the shaft power available to drive the generator. The generator-driving engine may become overloaded and lose speed. In extreme cases, the engine may stall and require re-starting.

In the prior-art, overload protection systems were employed to reduce or prevent engine overloading resulting from excessive increases in electrical loading. Prior art protection systems provide temporary electrical disconnection of excessive electrical load from the generator. Such temporary disconnection may occur for a time interval sufficient to allow the electrical load to decrease. After the electrical load reaches an acceptably reduced level, the load is then re-applied to the generator.

In an operating aircraft, a loss of electrical power may be catastrophic. Consequently, prior art protection systems provide mechanisms for avoiding a total absence of electrical power during the temporary disconnection period. For example, batteries or banks of capacitors (so-called supercapacitors) may provide temporary electrical power. However, in these prior-art overload protection systems, a certain time delay may be experienced before an alternate source of electrical power becomes available to the electrical load. This is because it is necessary to recognize a need for and then connect these alternate sources of electrical power to the load. Typically, this recognition and connecting process occurs through switching arrangements that require a finite time period for completion. This may result in a brief but nevertheless finite period of time when the electrical load is not provided with electrical power. Transition from one source to another without interruption is not a trivial task. Transient behavior may create serious disturbances to the loads that are connected to the bus. In addition, as is the case with almost any aircraft electrical component, the presence of batteries or supercapacitors may add undesired weight and a need for complex wiring interconnection within the aircraft.

As can be seen, there is a need to provide a protection system for an EPGS that prevents engine overloading without a loss of electrical power to an excessive electrical load. Additionally, in the case of an aircraft, there is a need to provide such a protection system without adding weight or external wiring interconnections to the aircraft.

SUMMARY OF THE INVENTION

In one aspect of the present invention, a control system for an electrical power generating system (EPGS) comprises a calculating device for determining a required voltage needed to sustain a measured current level of an electrical load with available power of an engine of the EPGS. A voltage controller provides control of an output of a generator of the EPGS at a voltage that corresponds to the calculated required voltage when electrical load on the EPGS exceeds the available power of the engine.

In another aspect of the present invention, a control apparatus for an electrical power generating system (EGPS) comprises a sensor for sensing a level of current of an electrical load applied to a generator of the EPGS, a controller for controlling output voltage of the generator, and a calculating device for determining a voltage required to provide the sensed level of current to the electrical load with power available from an engine of the EPGS. The calculating device and the controller are interconnected so that the output voltage corresponds to the determined voltage when the electrical load exceeds power available from the engine whereby overload protection is provided for the engine and the generator.

In another aspect of the present invention, a method for controlling an electrical power generation system (EPGS) comprises the steps of determining available power from an engine of the EPGS, determining a current level on a power bus of the EPGS, calculating a voltage required to sustain the determined current level with the determined available power from the engine, and controlling an output voltage of a generator of the EPGS at the calculated voltage.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful for providing overload protection of an EPGS. More particularly, the present invention may provide a system for altering a voltage at which power is delivered by a generator when an electrical overload develops. The present invention may be particularly useful in vehicles such as aircraft in which electrical loads may rapidly increase and in which even brief loss of electrical power may not be tolerable.

In contrast to prior-art overload protection systems, among other things, the present invention may embody a system in which electrical current may be provided, at a reduced voltage, to an electrical load when the electrical load exceeds power available at a shaft of an engine driving a generator of an EPGS. Instead of disconnecting an excessive electrical load from a generator, the present invention may reduce output voltage of a generator to permit continued delivery of power to an electrical load when the electrical load exceeds available shaft power thus protecting the engine from overloading and stalling. Additionally, the present invention may provide overload protection with no interruption of current flowing to an electrical load. And further, the present invention may provide overload protection without use of auxiliary electrical energy sources such as batteries or capacitors.

Figure 1:
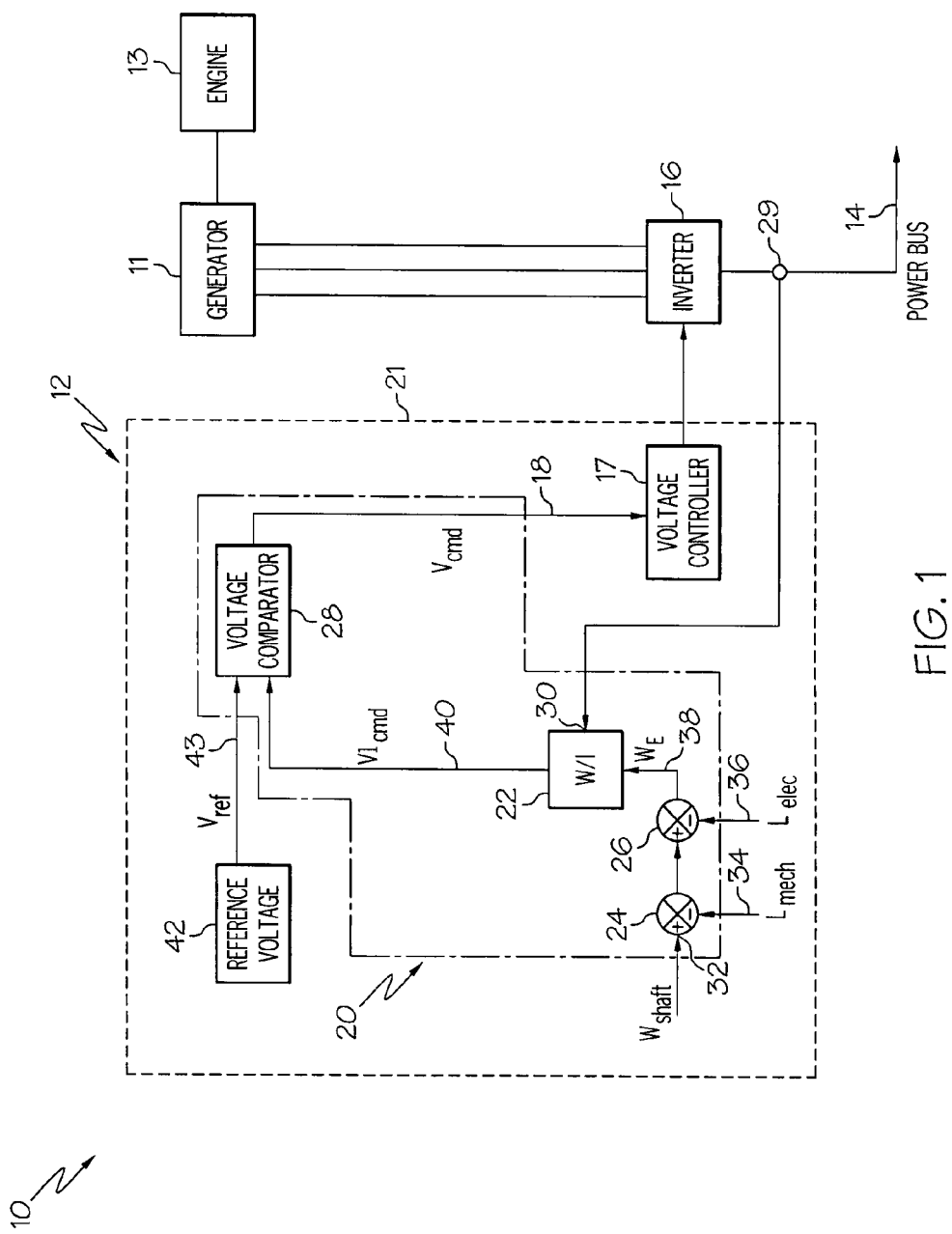
FIG. 1 is a block diagram of a control system for an electrical power generating system in accordance with the invention.

Referring now to FIG. 1, a block diagram symbolically illustrates an electric power generation system, designated generally by the numeral 10 (hereinafter EPGS 10). The EPGS 10 may comprise a rotating-shaft electrical generator 11 and a control system 12. The generator 11 may be driven by an engine 13. The generator 11 may be interconnected to a power bus 14 through an inverter 16. The inverter 16 may be provided with voltage control from a voltage controller 17 which may be a component of the control system 12. The voltage controller 17 may be employed to control the inverter 16 to rectify the output from the generator 11 into a desired DC output voltage. The voltage controller 17 may be commanded to maintain a particular voltage through a voltage command signal input 18 ($V_{cmd}$).

An overload protection system 20 may provide overload protection for the generator 11 and the engine 13. In one embodiment of the present invention, the overload protection system 20 may be comprised of various logic and calculating blocks of a conventional microprocessor or digital signal processor (DSP) 21. The DSP 21 may also embody elements of the control system 12 such as the voltage controller 17.

The overload protection system 20 may comprise a calculating device or W/I calculator block 22 (hereinafter W/I block 22), a mechanical loss calculator block 24, an electrical loss calculator block 26 and a voltage comparator 28. The overload protection system 20 may interconnected with the EPGS 10 through a current sensor 29 so that digital representations of current level in the power bus 14 may be transmitted to the W/I block 22 through a current input 30. Conventional sensors (not shown) may provide an engine shaft power signal 32 ($W_{shaft}$) to the mechanical loss calculator block 24 and a mechanical loss signal 34 ($L_{mech}$) to the block 24. Another conventional sensor (not shown) may provide an electrical loss signal 36 (($L_{elec}$) to the electrical loss calculator block 26. The output of the calculator block 26 may produce a calculated available electric power signal 38 ($W_E$)

The loss calculator blocks 24 and 26 may be interconnected with the W/I block 22 so that the W/I block 22 may produce a voltage command signal 40 ($V1_{cmd}$) and provide the $V1_{cmd}$ signal 40 to the voltage comparator 28.

A reference voltage source 42 may be interconnected with the voltage comparator 28 to provide a reference voltage signal 43 ($V_{ref}$) to the voltage comparator 28. When electrical load demands on the EPGS 10 are less than or equal to $W_E$, the W/I block 22 may provide a $V1_{CMD}$ signal 40 that is higher than or equal to $V_{ref}$. The voltage comparator 28 may then produce an inverter command signal, $V_{cmd}$ signal 18, at a voltage which is the equal to $V_{ref}$. The voltage regulator 17 may then regulate voltage of power provided to the power bus 14 at the voltage $V_{ref}$.

When electrical load demand exceeds $W_E$, the W/I block 22 may produce the $V1_{CMD}$ signal 40 at a voltage that is less than the voltage $V_{ref}$. In that case the voltage comparator may provide the $V_{cmd}$ signal 18 at a voltage less than $V_{ref}$. For example, if $V_{ref}$ is 115 V. and $V1_{CMD}$ may be determined to be 83.3 V. A voltage signal of 83.3 V. may be produced as the $V1_{CMD}$ voltage and provided to the input 40 of the voltage comparator 28. The voltage comparator 28 may then produce $V_{cmd}$ at a voltage of 83.3 V. The voltage regulator 17 may then command the inverter 16 to deliver power to the power bus 14 at a voltage of 83.3 V.

Figure 2:
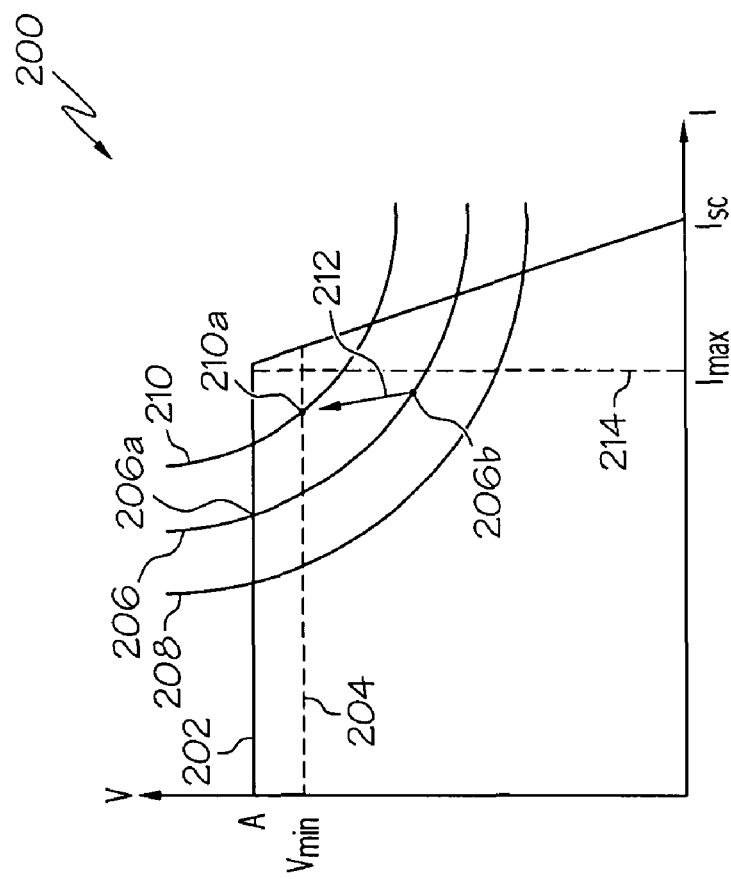
FIG. 2 is a graph representation of current versus voltage relationships provided in accordance with the invention.

Referring now to FIGS. 1 and 2, a more detailed understanding of operational aspects of the present invention may be realized. A voltage versus current graph 200 is illustrated in FIG. 2. A solid horizontal line 202 may represent a desired voltage of operation of the EGPS 10. This line 202 may correspond to $V_{ref}$. A dashed horizontal line 204 may represent a minimum voltage $V_{min}$. $V_{min}$ may be a voltage below which certain electrical power loads may be damaged. For example a small electric motor connected to the power bus 14 may rapidly overheat if it is supplied with electrical power at a voltage lower than $V_{min}$.

A curved line or power limit curve 206 may represent a power limit relationship between current and voltage. The power limit curve 206 may define a voltage at which a particular current level may be sustained in the power bus 14. It may be seen that for any current level less than that represented at a point 206a, power may be supplied at the voltage $V_{ref}$. At these current levels, a power limit of the engine 13 of FIG. 1 will not be exceeded when electrical power is delivered at $V_{ref}$. However, if current level on the power bus 14 exceeds the current represented by the point 206a, then the electrical power may be provided in accordance with the voltage-current relationship defined by the power limit curve 206. As current level increases, voltage is reduced in correspondence to the power limit curve 206.

The power limit curve 206 may represent power limits for the engine 13 in a first set of engine operating conditions. However the power limit of the engine 13 may be altered during its operation. For example, the engine 13 may be provided with a fuel boost or thrust loads on the engine may decrease or increase. In these changed circumstances the power limit of the engine 13 may not be accurately represented by the power limit curve 206. A changed engine power limit may be more suitably represented by other power limit curves such 208 or 210. The power limit curve 210 may represent a condition in which the engine 13 may be able to provide more deliverable power than that represented by the power limit curve 206. The power limit curve 208, on the other hand, may represent lower engine power availability.

Voltage-current relationships that correspond to any number of power limit curves such as the curves 206, 208 and 210 may be programmed into the W/I block 22. The W/I block 22 may apply data received through the inputs 30 and 38 to these programmed relationships in order to calculate and provide a proper level of $V1_{cmd}$ voltage to the input 40 of the voltage comparator 28. Calculation transitions may be made between and among any number of the programmed power limit curves such as 206, 208 or 210 as engine power availability changes. This concept is illustrated graphically with a transition line 212 connecting points 206b and 210a on FIG. 2.

The W/I block 22 may perform numerous calculations in rapid succession. Typically, these calculations may be performed at a rate of between about two to about five calculations per millisecond (msec.). Newly acquired input data is provided to the W/I block 22 for each calculation. Consequently, the overload protection system 20 may have virtually instantaneous responsiveness to changes in electrical load and engine power availability. The system 20 may provide protection immediately whenever it may be needed without any interruption of current on the power bus 14. Conversely, a desired $V_{ref}$ may be restored immediately when overload protection is no longer needed.

Figure 3:
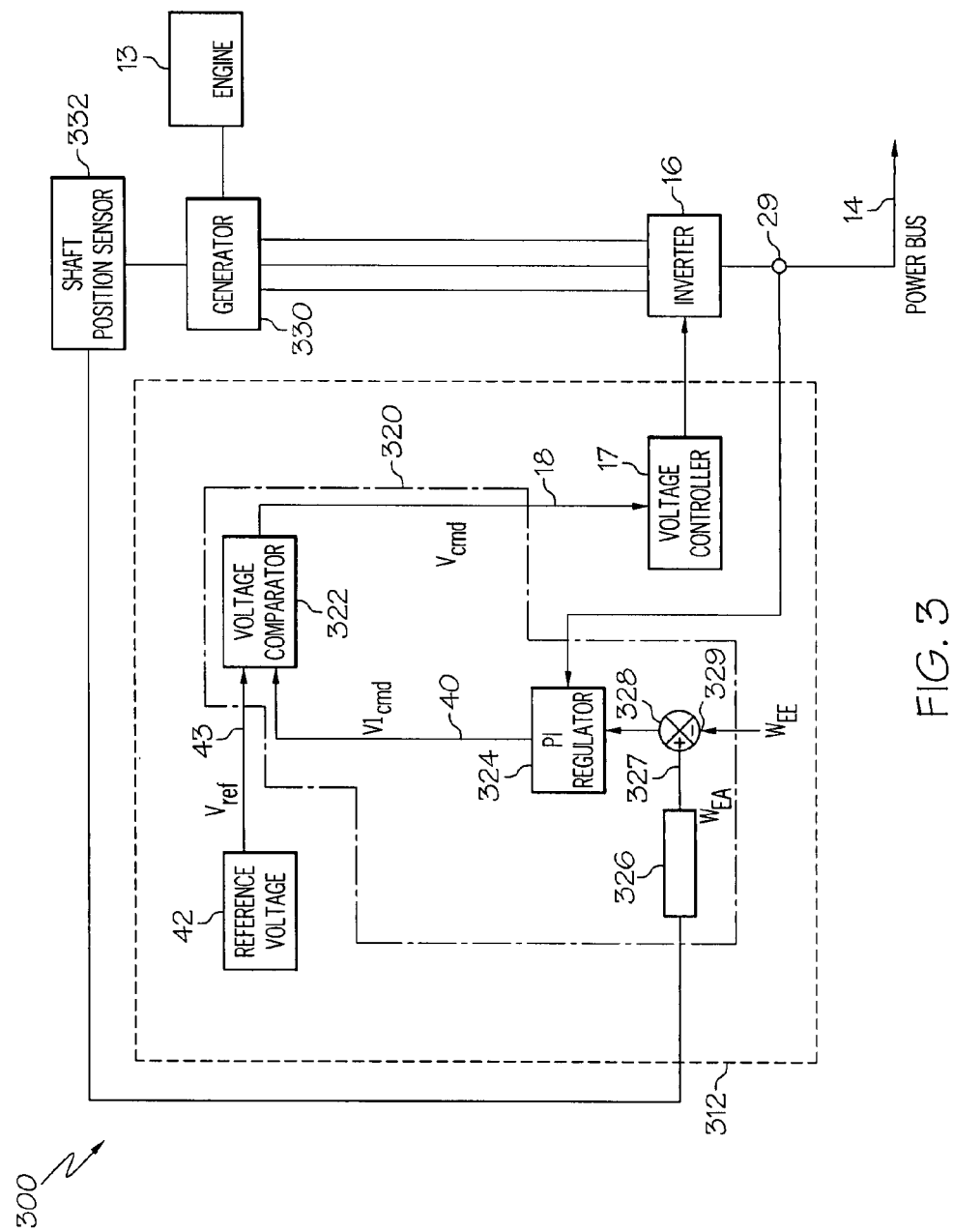
FIG. 3 is a block diagram of a control system for an electrical power generating system in accordance with the invention.

Referring now to FIG. 3, another embodiment of the present invention is illustrated. An EGPS 300 may be configured with a control system 312 having an overload protection system 320. The overload protection system 320 may comprise a voltage comparator 322, a proportional integral (PI)

regulator 324, a shaft speed/power analyzer 326 and an error calculator 328. A generator 330 may be provided with a shaft position sensor 332. In all other respects the elements of the EPGS 300 shown in FIG. 3 are equivalent to those of the EPGS 10 shown in FIG. 1.

In operation, the overload protection system 320 may utilize the PI regulator 324, the error calculator 328 and the shaft speed/power analyzer 326 to calculate a $V1_{CMD}$. An available mechanical power signal 327 ($W_{EA}$) is obtained from shaft speed signals from the shaft positions sensor 332 and predefined loss values programmed into the speed/power analyzer 326. The $V_{cmd}$ voltage provided to the voltage regulator 17 may be equal to $V_{ref}$ when the $W_{EA}$ signal 327 is greater than electrical power demand. The PI regulator 324 may produce the $V1_{cmd}$ signal 18 by converting a difference between the $W_{EA}$ signal 327 and a measured power demand signal 329 ($W_{EE}$). The $V1_{cmd}$ signal 18 may be lower than $V_{ref}$ when the $W_{EE}$ signal 329 exceeds the available electrical power signal 327 ($W_{EA}$).

It may be noted that the control system 12 and the overload protection system 20 of FIG. 1 may be incorporated into a single microprocessor or DSP such as the DSP 21 of FIG. 1. Consequently, the overload protection system 20 may be introduced into a typical pre-existing aircraft design without adding weight or external wiring interconnections. This is because typical existing aircraft designs may already incorporate DSP based or microprocessor based control system for EGPS's. The inventive overload protection system 20 may be added to a DSP based or microprocessor based EGPS control system by merely programming additional software into the DSP or microprocessor. Similarly the overload protection system 320 of FIG. 3 may be incorporated into a DSP or microprocessor that embodies the control system 312 of FIG. 3.

Figure 4:
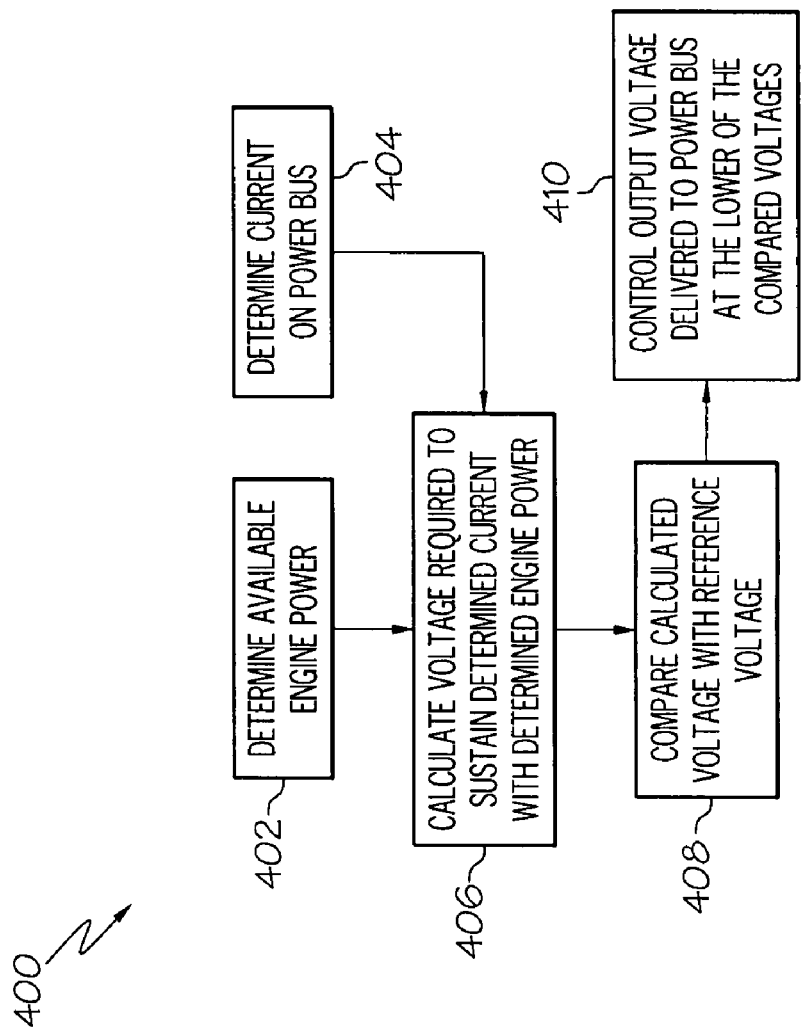
FIG. 4 is a flow chart of a method for controlling an electrical power generating system in accordance with the present invention.

In one embodiment of the present invention, a method is provided for achieving overload protection for an EGPS. FIG. 4 illustrates, in block form, a method 400 for protecting an engine of an EGPS from electrical overloads. In a step 402, available engine power may be determined (e.g. through provision of an engine shaft power signal 32 ($W_{shaft}$)) to the mechanical loss calculator block 24 and a mechanical loss signal 34 ($L_{mech}$) to the block 24 and by provision of an electrical loss signal 36 ($L_{elec}$) to the electrical loss calculator block 26). In a step 404, current level in a power bus may be determined (e.g. through the current sensor 29 on the power bus 14). In a step 406, a voltage (e.g. $V1_{CMD}$) may be calculated (e.g. by the W/I block 22), which voltage may sustain the current level determined in step 404 with the available engine power determined in step 402.

In a step 408, a comparison may be made between a reference voltage (e.g. $V_{ref}$) and the voltage calculated in step 406 to determine which of the two voltages is lower. In a step 410, control of voltage delivered to a power bus may be made at the lower of the voltages compared in step 408.

It should be understood, of course, that the foregoing relates to exemplary embodiments of the invention and that modifications may be made without departing from the spirit and scope of the invention as set forth in the following claims.

We claim:

1. A control system for an electrical power generating system (EPGS) comprising:
   a calculating device for determining a calculated required voltage needed to sustain a measured current level of an electrical load with available power of an engine of the EPGS;
   a voltage controller for controlling an output of a generator of the EPGS at a voltage that corresponds to the calculated required voltage, when electrical load on the EPGS exceeds the power of the engine; and
   a voltage comparator for comparing a reference voltage and the calculated required voltage to provide a command voltage output that corresponds to the lower of the reference voltage and the calculated required voltage, wherein
   the voltage comparator is interconnected with the voltage controller so that the output of the generator is controlled at the command voltage.

2. The control system of claim 1 wherein a single microprocessor embodies both the calculating device and the voltage controller.

3. The control system of claim 1 wherein:
   the command voltage is continuously made available to the voltage controller; and
   the voltage controller continuously controls output voltage at the command voltage irrespective of whether the electrical load exceeds available power of the engine, whereby the control system EPGS is provided with overload protection without disconnection of the electrical load from the generator.

4. The control system of claim 3 wherein the overload protection is provided without use of auxiliary power sources.

5. A control system for an electrical power generating system (EPGS), comprising:
   a calculating device for determining a calculated required voltage needed to sustain a measured current level of an electrical load with available power of an ermine of the EPGS; and
   a voltage controller for controlling an output of a generator of the EPGS at a voltage that corresponds to the calculated required voltage, when electrical load on the EPGS exceeds the power of the ermine, wherein:
   the calculating device is provided with current level signals from a power bus of the EPGS;
   the calculating device is provided with engine-power-available input signals; and
   the required voltage is determined by the calculating device with periodic calculations based on said input signals.

6. The control system of claim 5 wherein the required voltage is determined at a frequency of about 2 to about 5 times per millisecond.

7. The control system of claim 5 wherein:
   the calculating device is programmed with a plurality of voltage-versus-current power limit relationships; and
   the calculating device determines the required voltage on the basis of one of the voltage-versus-current power limit relationships that corresponds to the engine-power-available signal that is produced at the time of the determination.

8. The control system of claim 5 wherein a single microprocessor embodies both the calculating device and the voltage controller.

9. A control system for an electrical power generating system (EPGS) comprising:
   a calculating device for determining a calculated required voltage needed to sustain a measured current level of an electrical load with available power of an engine of the EPGS;
   a voltage controller for controlling an output of a generator of the EPGS at a voltage that corresponds to the calculated required voltage, when electrical load on the EPGS exceeds the power of the ermine;
   a mechanical loss calculator; and
   an electrical loss calculator;

wherein the loss calculators receive an engine shaft power signal and collectively produce an engine-power-available input signal to the calculating device.

10. The control system of claim 9 wherein:

the calculating device is provided with current level signals from a power bus of the EPGS;

the calculating device is provided with engine-power-available input signals; and the required voltage is determined by the calculating device with periodic calculations based on said input signals.

11. The control system of claim 10 wherein the required voltage is determined at a frequency of about 2 to about 5 times per millisecond.

12. The control system of claim 10 wherein:

the calculating device is programmed with a plurality of voltage-versus-current power limit relationships; and the calculating device determines the required voltage on the basis of one of the voltage-versus-current power limit relationships that corresponds to the engine-power-available signal that is produced at the time of the determination.

13. The control system of claim 9 wherein a single microprocessor embodies both the calculating device and the voltage controller.

* * * * *